Figure 3:

June 12, 1956  J. K. TAGGART  2,749,644
FISHING REEL SECURING DEVICE
Filed March 12, 1953
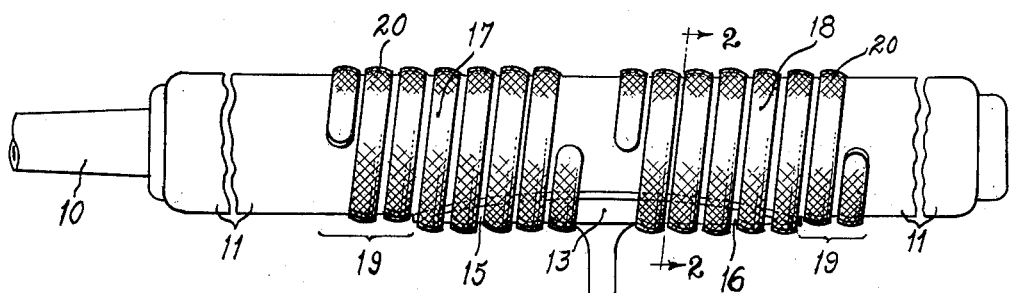
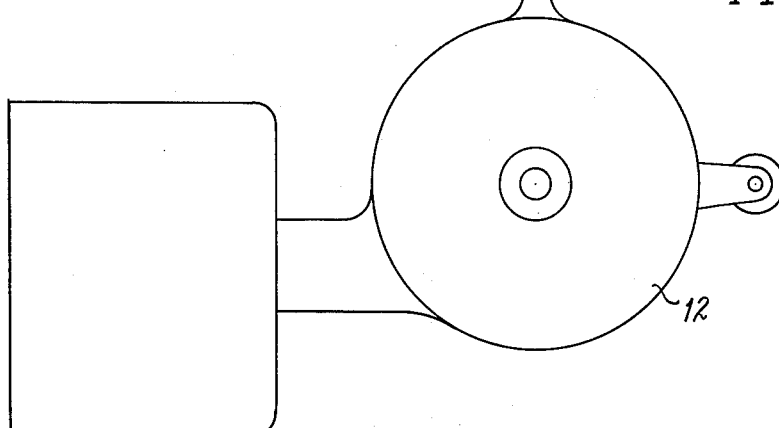

INVENTOR
JOHN K. TAGGART.
BY George A. Ordway
ATTORNEY though less effectively than the preferred form of Fig. 3.

United States Patent Office
2,749,644
Patented June 12, 1956

2,749,644
FISHING REEL SECURING DEVICE
John K. Taggart, Indianapolis, Ind.

Application March 12, 1953, Serial No. 341,945

5 Claims. (Cl. 43—22)

This invention relates to a device for removably mounting and affixing reels upon fishing rods and more particularly to an improved hand grip and reel mount securing device.

Devices heretofore provided and employed for this purpose generally involve the use of either slidable, radially recessed, frictionally-retained ferrules or expensively machined collars threadably engaging correspondingly threaded portions attached to or formed integrally with the fishing rod handles. Such devices, in the main, are of relatively expensive construction, susceptible to getting out of order, and more or less prescribe fixed limits as to range of location of the reels longitudinally upon the handles. Moreover, repair of such devices frequently require repair of corresponding counterparts which are affixed to the handles, as well as repair or replacement of the movable ferrules or collars associated therewith.

Accordingly, it is an object of the present invention to provide a reel mount attaching device that is markedly simple in design and construction, rugged, inexpensive to manufacture, and reliably operative in effecting a secure but detachable mounting of the reel to the rod.

Another object is to provide a device of this character which is readily and inexpensively replaceable should damage occur thereto and without requiring any special tools or equipment or attendant repair of the rod handle or any parts thereon.

A further object is to provide a hand grip device for detachably securing a reel upon a fishing rod which affords a latitude of choice of place for mounting the reel that is substantially co-extensive with the length of the rod handle.

A still further object is to provide a securing device of this character which, by its novel construction, serves as a ventilated handle should the user desire to grasp the rod at that place therealong where the reel is mounted, this being frequently the case, particularly in connection with fishing reels of the spinning type.

Other objects and advantages of the invention will be apparent as the description proceeds in conjunction with the accompanying drawings, and will be more particularly pointed out in the claims which follow.

Figure 2:
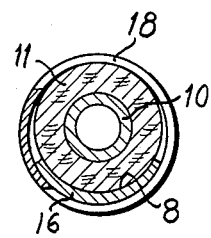
Figure 4:
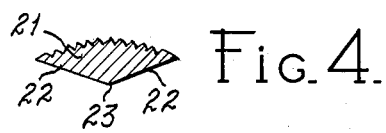
Figure 5:
Figure 6:
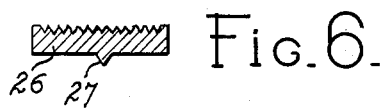

In the drawings:

Fig. 1 is a side elevation showing a fishing rod and handle with a reel affixed thereto by my improved reel mount securing device, Fig. 2 is a sectional elevation taken along the line 2—2 of Fig. 1, Fig. 3 is a greatly enlarged transverse cross section of a preferred form of stock used in fabricating the securing device, and Figs. 4, 5, and 6 are similar to Fig. 3 but showing modified forms of stock which can be employed.

Referring to Fig. 1, there is shown a conventional fishing rod 10 having the usual handle 11 affixed thereto. Handle 11 is generally formed either of a plurality of cylindrical cork sections tightly compressed together in end-to-end relation or in one single, continuous sheath of cork. The cork or like material from which such handles are customarily constructed is somewhat yielding or pliant and the present invention advantageously utilizes this characteristic. The invention is herein exemplified in connection with a reel 12 of the spinning type although it will be understood that it is equally adaptable for affixing casting, fly, or similar reels to fishing rods. Reel 12 has the usual reel mount 13 formed integrally upon the upper end of an upstanding leg 14 projecting from the reel. Mounts such as 13 generally have their upper surfaces dished or concaved as at 8 (Fig. 2), the radius of curvature corresponding substantially to that of the cylindrical handle so that the fore and aft projections 15 and 16, respectively, of the reel mount mate flat and flush with the surface of handle 11 as clearly shown in Figs. 1 and 2.

The means of the present invention for detachably securing mount 13 to handle 11 will now be described. This means comprises a pair of spiral strip or coil spring sections 17 and 18 corresponding, respectively, to the fore and aft projections 15 and 16 of reel mount 13. Each spring section preferably is composed of a sufficient number of convolutions to render its length co-extensive with the entire free length of its corresponding projection 15 or 16 and to additionally overlap marginally a relatively short portion 19 of the corresponding fore and aft adjacent handle area. If desired, the number of convolutions may be reduced to such an extent that the spring section is merely substantially co-extensive in length with or slightly shorter than its corresponding projection 15 or 16 although best results have been obtained with the marginal end overlap 19 which furnishes more extensive finger-gripping area for its fisherman.

Preferably the internal diameter of each spring section is slightly (on the order of .0010 of an inch) less than the external diameter of the rod handle. In any event, the internal diameter is such as will cause a relatively secure constrictive frictional engagement of the internal surfaces of each of the convolutions around and upon the slightly yielding external surface of the handle so as to effect a slight but substantial self-threading action therein. The material from which the spring sections are fabricated can be copper beryllium, steel, or the like and preferably is of a flattened ovate or ellipsoidal transverse cross section as shown in Fig. 3. I have found 3/16 of an inch wide, 1/32 of an inch thick copper beryllium to give excellent results. The external surfaces of each of the convolutions are desirably roughened or knurled as at 20 to provide a good grasping surface.

In securing mount 13 to handle 11, it is merely necessary to threadingly rotate the spring sections 15 and 16 co-axially over and along the handle and to have fore section 17 spaced sufficiently apart from aft section 18 to permit the insertion therebetween of reel mount 13 in that longitudinal location along the handle whereat it is desired to secure the reel. Following such placement of the reel mount, with the full hand grasping the entire spring section, each section 17 and 18 is rotated upon the handle in a direction opposite to the constrictive bias influence of its convolutions toward and over its companion mount projection 15 or 16 so that it threadingly and tightly frictionally surrounds and embraces both the reel mount 13 and the adjacent portion of the handle. When the sections have been thus rotated to their innermost positions so that their inner leading ends lie next to leg 14 as shown in Fig. 1, they are each rotated slightly in an opposite direction to cause the convolutions to further constrict upon and seize slightly into the cork thus insuring a secure, dependable and positive affixing of the reel thereon. To remove the reel or change its position of mounting along handle 11, it is merely necessary to relieve the constrictive action of the spring sections as by again turning them in a direction against the constrictive bias of their convolutions and threadingly move them axially along the surface of handle 11 to the newly desired location.

In the modified form of invention shown in Fig. 4, the stock 21 used in forming sections 17 and 18 is of a flattened, sector shape which provides an internal surface of opposed sloping sidewalls 22 forming a slight point 23. With this form, a deeper and more penetrating threading action into the cork or like material of which the handle may be made, is effected.

Fig. 5 shows a flat, rectangular shape of stock which may be employed for forming sections 17 and 18. Here, the area of engagement of the internal surfaces of the convolutions with the surface of handle 11 is somewhat increased but the grooving or threading penetrative action into the cork or other handle material is somewhat lessened. If desired, the internal surface 24 may be provided with serrations such as 25 extending widthwise across the stock to increase the frictional grasp of the convolutions in their constrictive embrace of the handle. It will be understood, of course, that if desired, similar serrations may be provided in the forms of the invention heretofore described in conjunction with Figs. 1 to 4, inclusive.

The modification shown in Fig. 6 utilizes stock which is substantially of the same transverse cross sectional shape as that shown in Fig. 5 but the internal surface 26 of the convolutions is provided with an acute, inwardly projecting thread 27 medially thereof, thread 27 extending continuously throughout the lengths of sections 17 and 18. This thread is of considerably greater pitch than that of sloping walls 22 of Fig. 4 and therefore, tends to cut into the cork or other material and establish a more or less permanent thread or groove therein. This form of the device is not as satisfactory for use with rod handles made up of a plurality of cylindrical cork sections pressed together because thread 27, where it meets with the joints of such sections, tends to split them apart, one from the other, notwithstanding the yield which is present in the individual convolutions.

As shown in Fig. 1, in forming sections 17 and 18, the convolutions may be spaced slightly from each other (on the order of $\frac{1}{16}$ of an inch). Hence, when the handle is grasped at the place of the reel mounting with leg 14 extending downwardly between the fingers, and it is here noted that the handle is so grasped in instances where a spinning type of reel is used, this spacing provides a passage for the free flow of air between the fingers and palm and the handle, and thus provides a ventilated handle which contributes to the comfort of the angler.

I claim:

1. A hand grip for a fishing rod handle of the type having associated therewith a reel mount provided with projections on opposite sides of a reel leg, said grip comprising two spiral strips each having a smooth inner face and a roughened outer face, each of said strips comprising a sufficient number of coils to fit over said projections and grip the same to said rod handle and provide a number of coils outside of said projections to furnish finger grips, whereby two or more fingers of the fisherman are adapted to be held in contact with the roughened faces on opposite sides of the leg while maintaining the rod in grasped position, the inner diameter of the strip coils being slightly less than the diameter of the rod handle.

2. A device according to claim 1 wherein said inner faces of said spiral strips are of convex form.

3. A device according to claim 1 wherein said inner faces of said spiral strips are angular.

4. A device according to claim 1 wherein said inner faces of said spiral strips are flat and transversely grooved.

5. A device according to claim 1 wherein said inner faces of said spiral strips are toothed.

References Cited in the file of this patent

UNITED STATES PATENTS

| 2,487,346 | Liberty | Nov. 8, 1949 |
| 2,616,204 | Bennett | Nov. 4, 1952 |

FOREIGN PATENTS

| 119 | Great Britain | 1893 |
| 24,378 | Great Britain | 1913 |
| 949,446 | France | Feb. 21, 1949 |